United States Patent
Stockhammer

(10) Patent No.: US 8,938,010 B2
(45) Date of Patent: Jan. 20, 2015

(54) METHOD FOR DECODING A DATA STREAM AND A RECEIVER

(75) Inventor: Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 1305 days.

(21) Appl. No.: 12/293,345

(22) PCT Filed: Mar. 12, 2007

(86) PCT No.: PCT/EP2007/052280
§ 371 (c)(1),
(2), (4) Date: Jan. 12, 2009

(87) PCT Pub. No.: WO2007/107472
PCT Pub. Date: Sep. 27, 2007

(65) Prior Publication Data
US 2009/0232222 A1 Sep. 17, 2009

(30) Foreign Application Priority Data
Mar. 17, 2006 (DE) .......................... 10 2006 012 449

(51) Int. Cl.
*H04N 7/12* (2006.01)
*H04N 19/61* (2014.01)
*H04N 19/176* (2014.01)

(52) U.S. Cl.
CPC ............. *H04N 7/50* (2013.01); *H04N 7/26244* (2013.01)
USPC ................................ 375/240.24; 375/240.28

(58) Field of Classification Search
USPC ........................................ 375/240.24, 240.28
See application file for complete search history.

(56) References Cited

U.S. PATENT DOCUMENTS

| | | | | |
|---|---|---|---|---|
| 5,963,909 A * | 10/1999 | Warren et al. | ............... | 705/52 |
| 6,360,265 B1 * | 3/2002 | Falck et al. | ............... | 709/227 |
| 6,754,439 B1 * | 6/2004 | Hensley et al. | ............... | 386/341 |
| 7,280,566 B2 * | 10/2007 | Okamoto et al. | ............... | 370/542 |
| 7,831,265 B1 * | 11/2010 | Shen et al. | ............... | 455/464 |
| 2002/0041629 A1 * | 4/2002 | Hannuksela | ............... | 375/240.12 |
| 2003/0021346 A1 * | 1/2003 | Bixby et al. | ............... | 375/240.25 |
| 2003/0156543 A1 * | 8/2003 | Sahinoglu et al. | ............... | 370/238 |
| 2004/0237104 A1 * | 11/2004 | Cooper et al. | ............... | 725/38 |
| 2004/0258308 A1 * | 12/2004 | Sadovsky et al. | ............... | 382/190 |

(Continued)

FOREIGN PATENT DOCUMENTS

WO WO 2004114668 A1 * 12/2004

OTHER PUBLICATIONS

Anonymous: "Method for seamless transitions between video decoders" IP.com Journal, IP.com Inc., West Henrietta, NY, US, Aug. 6, 2003, XP013012336, ISSN: 1533-0001, 4 pages.

(Continued)

*Primary Examiner* — Benjamin Lanier
(74) *Attorney, Agent, or Firm* — Fulbright & Jaworski LLP

(57) ABSTRACT

In the case of a method for decoding a data stream a first decoding means (DR2) is provided which is configured to decode from a data stream in a first data stream format at least two units of user data, wherein for decoding the second unit of the at least two units at least partial information from the first unit of the at least two units is used. Likewise reference data is provided and subsequently the first decoding means (DR2) is initialized with the information from the reference data. The data stream in the first data stream format is supplied to the first decoding means and decoded into at least one unit of user data using the information from the reference data.

20 Claims, 6 Drawing Sheets

(56) References Cited

U.S. PATENT DOCUMENTS

Figure 1:
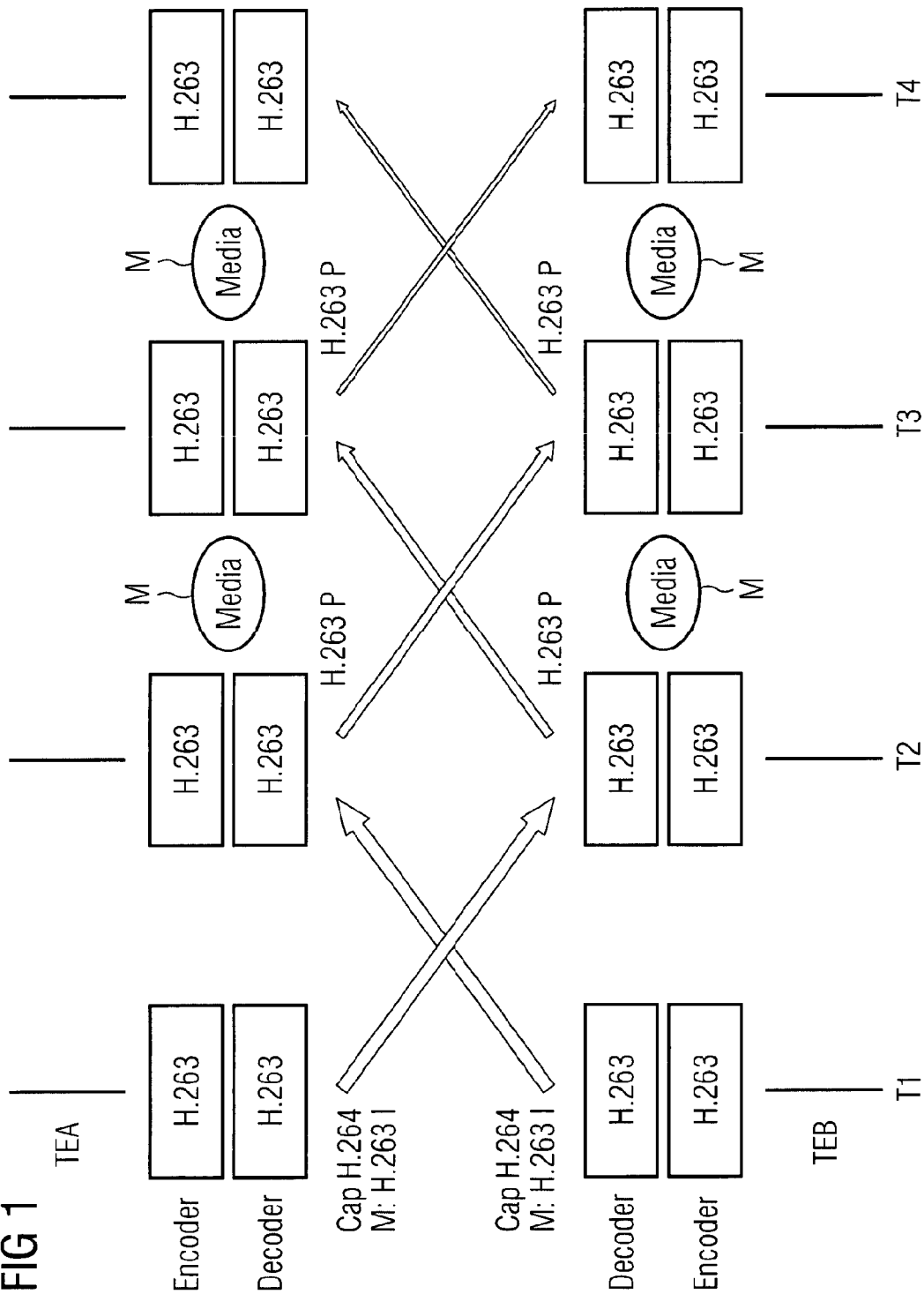

2005/0060711 A1* 3/2005 Ericsson et al. ............... 718/107
2005/0123058 A1* 6/2005 Greenbaum et al. ..... 375/240.28
2006/0171372 A1* 8/2006 Mundra et al. ................. 370/352
2007/0110150 A1* 5/2007 Wang et al. ................ 375/240.1

OTHER PUBLICATIONS

Basso A., "Beyond 3G video mobile video telephony: The role of 3G-324M in mobile video services" Multimedia Tools and Applications, Kluwer Academic Publishers, BO, vol. 28, No. 1, Feb. 1, 2006, pp. 173-185, XP019213905, ISSN: 1573-7721.

International Search Report and Written Opinion—PCT/EP2007/052280—ISAEPO—Aug. 24, 2007.

Liu T-M., et al., "A 125µW Fully Scalable MPEG-2 and H.264/AVC Video Decoder for Mobile Applications", Digest of Technical Papers of the IEEE International Solid-State Circuits Conference, ISSCC 2006, Session 22, Low Power Multimedia, Feb. 5, 2006-Feb. 9, 2006, pp. 1-10, XP002446773.

* cited by examiner

METHOD FOR DECODING A DATA STREAM AND A RECEIVER

The invention relates to a method for decoding a data stream, in particular a video data stream, and also a receiver for a video data stream.

In modern communication systems, for example UMTS/WCDMA (Universal Mobile Telecommunication System) or also WLAN (Wireless Local Area Network) there is a requirement to transmit in addition to individual images to transmit also moving images in the form of video data between two mobile radio units, so-called terminals. Known methods and standards, for example the H.324 Standard for Mobile Radio Standard WCDMA/UMTS, already exist for this purpose.

Owing to the numerous providers of telecommunication units or mobile radio units in different price and application categories it is possible that not every mobile radio unit can use the same encoding and decoding methods and thus cannot use the same transmission standards for video data. Thus, for example, video transmission standards H.263 and H.264 are available for a video transmission using mobile communication units. The two video transmission standards mentioned use the so-called "predictive coding", where information relating to a first video image, a so-called frame, is also used for decoding a subsequent video image. In other words, in the case of video transmission standards in part only the differences in an image with respect to a preceding image are coded. As a consequence, it is possible to achieve highly efficient coding.

In order to transmit video images between two mobile communication units, once the connection has been made the two units must agree on a common decoding and encoding method. At the same time, however, there is a need for users of mobile communication units to be able to commence transmitting the images as desired as quickly as possible and without any loss of time and to see the dialog partner. If during an existing video transmission a connection parameter for example the band width available for the transmission changes, then it can be necessary to switch over to a different video standard. Such a switching procedure is to be performed where possible without interrupting the existing video transmission, so that the user does not notice any disturbing frozen images or artifacts in the video image.

The object of the invention is to provide a method with which it is possible to switch quickly between different decoding methods for a data stream. It is also an object of the invention to provide a receiver which enables the user data to flow without interruption even when the data stream format changes.

These objects are achieved with the subjects of the patent claims 1 and 7. Advantageous embodiments and developments of the invention are the subject of the subordinate claims.

The invention proposes to provide a decoder or a decoding means which is configured to decode from a data stream in a first format at least two user data-blocks. The term 'user data-block' is understood to refer to a specific amount of user data, for example one image. The decoder can use for this purpose information in the first user data-block to decode the at least one second block. The decoder uses a "predictive coding", in that it uses partial information in blocks of already decoded user data to decode the subsequent blocks of user data. For the decoding method the data stream is directed in the first format to the decoder which subsequently generates the user data in several steps. In accordance with the invention, the decoder is now initialized with information in a reference data-block prior to the data stream being supplied.

This reference data-block ensures that the decoder commences immediately and without time delay to decode the data stream supplied. In particular, as a consequence, the decoder is able to use the reference data-block for decoding the blocks of user data. As a consequence, a first user data-block can be decoded using the information in the reference data-block.

The method in accordance with the invention can be used in an advantageous manner in particular when changing between two decoding means for decoding data streams with different data formats. For example, the information in the reference data-block can be derived from one user data-block of a second decoder which is configured to decode from a second data stream at least one user data-block. If, for example, the second decoding means is switched off and the first decoding means is deployed, then the information in a user data-block decoded from the second decoding means can be used as information in the block of reference data for the first decoding means. Thus, this decoder can be initialized with information which enables decoding to take place without interruption, even where there is a change between two data streams of different formats.

In one embodiment, the method thus furthermore comprises the steps of receiving a data stream in a second format and decoding this data stream in at least one user data-block. This block is subsequently stored temporarily as a reference data-block and the first decoding means is activated and simultaneously initialized.

In one embodiment of the invention such a change is indicated, where, for example, a stream of transport data is received which contains the data stream and also a control signal. This indicates the change of the second decoding means to the first decoding means and contains at the same time the information in the reference data-block for initializing the first decoding means. The control signal can, for example, include a reference to information in a block of user data from the second decoding means and thereby reference the reference data-block itself. This information is then used to initialize the first decoding means, so that it can decode the data stream received without interruption In a further embodiment, the data stream is generated in the second format, in which at least one block of input user data is encoded using a first encoding means (E1) and allocated to the encoded block of the control signal. The generating step includes the following steps of:

saving the at least one block of user data as a user reference data-block;

deactivating the first encoding means;

activating a second encoding means which is configured to generate the data stream in the first data stream format;

initializing the second encoding means with information in the user reference data-block.

As a consequence, it is guaranteed that both on the transmitter side, and also on the receiver side the switch-over occurs essentially synchronously, so that the data streams are not processed with the incorrect encoding or decoding means.

The first or the second data stream format can comprise different data formats. For example, it can have an image format according to the JPEG- or the PNG standard. Likewise, it can be in the format of a video transmission standard, for example, the standards H.263, H.264 or MPEG2.

In another aspect of the invention, the receiver comprises an input for supplying a data stream in a first or second format. The receiver comprises a first decoding means and a second decoding means. The first decoding means is configured to decode from a data stream which is supplied on the input-side and is in the first data stream format at least one block of user data. For this purpose, the first decoding means comprises a buffer. The second decoding means is configured to extract from the data stream in the second format likewise at least one block of user data. The receiver is implemented so that in response to a change in the format in the data stream supplied at the input it will change from the second decoding means to the first decoding means. Likewise, the buffer of the first decoding means is coupled to the second decoding means for initialization with a reference data-block. The reference data-block is derived from the at least one block of user data which can be generated before the second decoding means. Using the coupling in accordance with the invention it is ensured that in the case of a switch-over the first decoding means is initialized with a start value and thus a data stream supplied can be decoded without interruption. This is then of particular advantage if at least the first decoding means is configured to use a "predictive coding", where information from already decoded user data is also required for user data still to be decoded.

Figure 2:
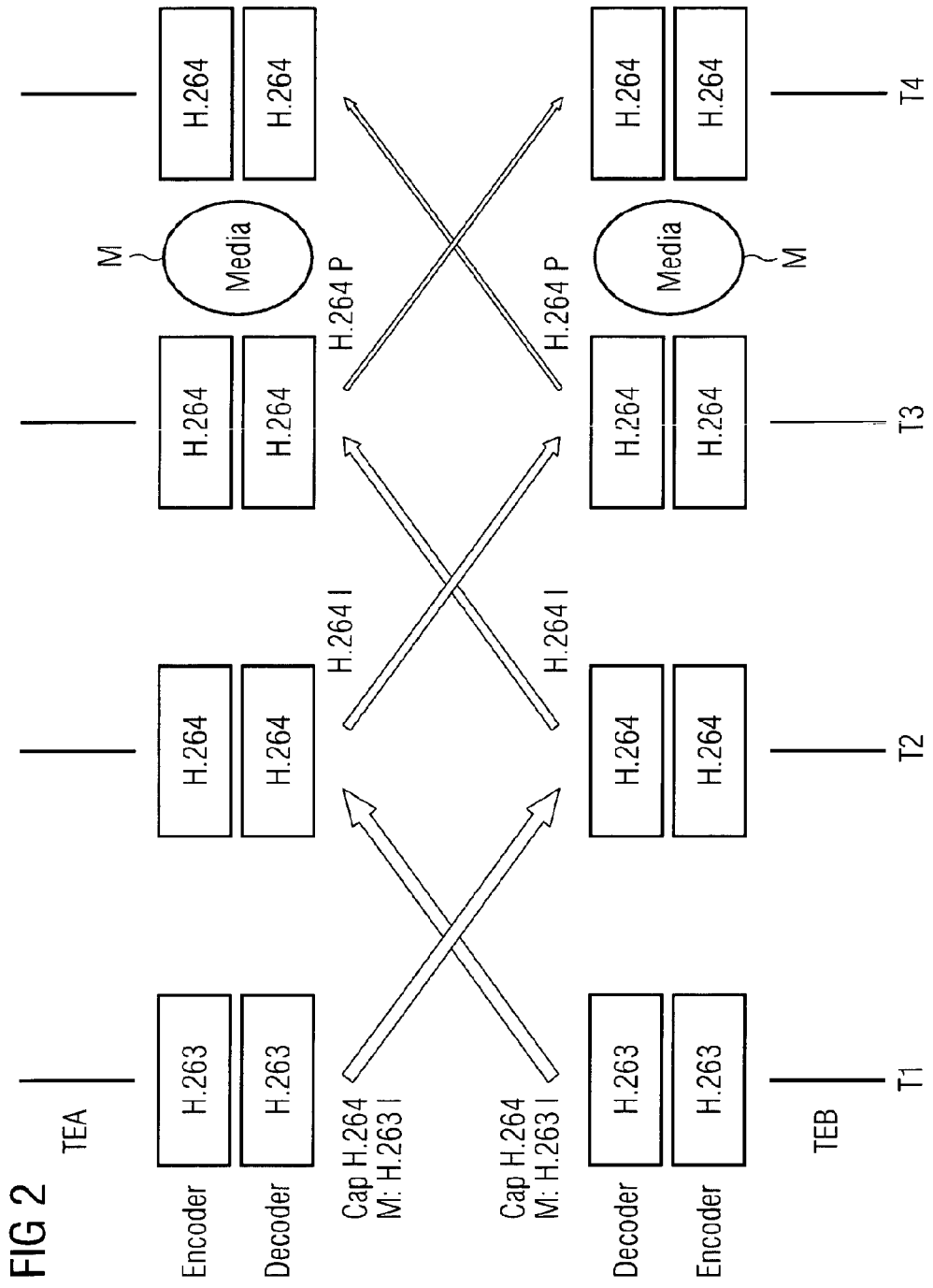
Figure 3:
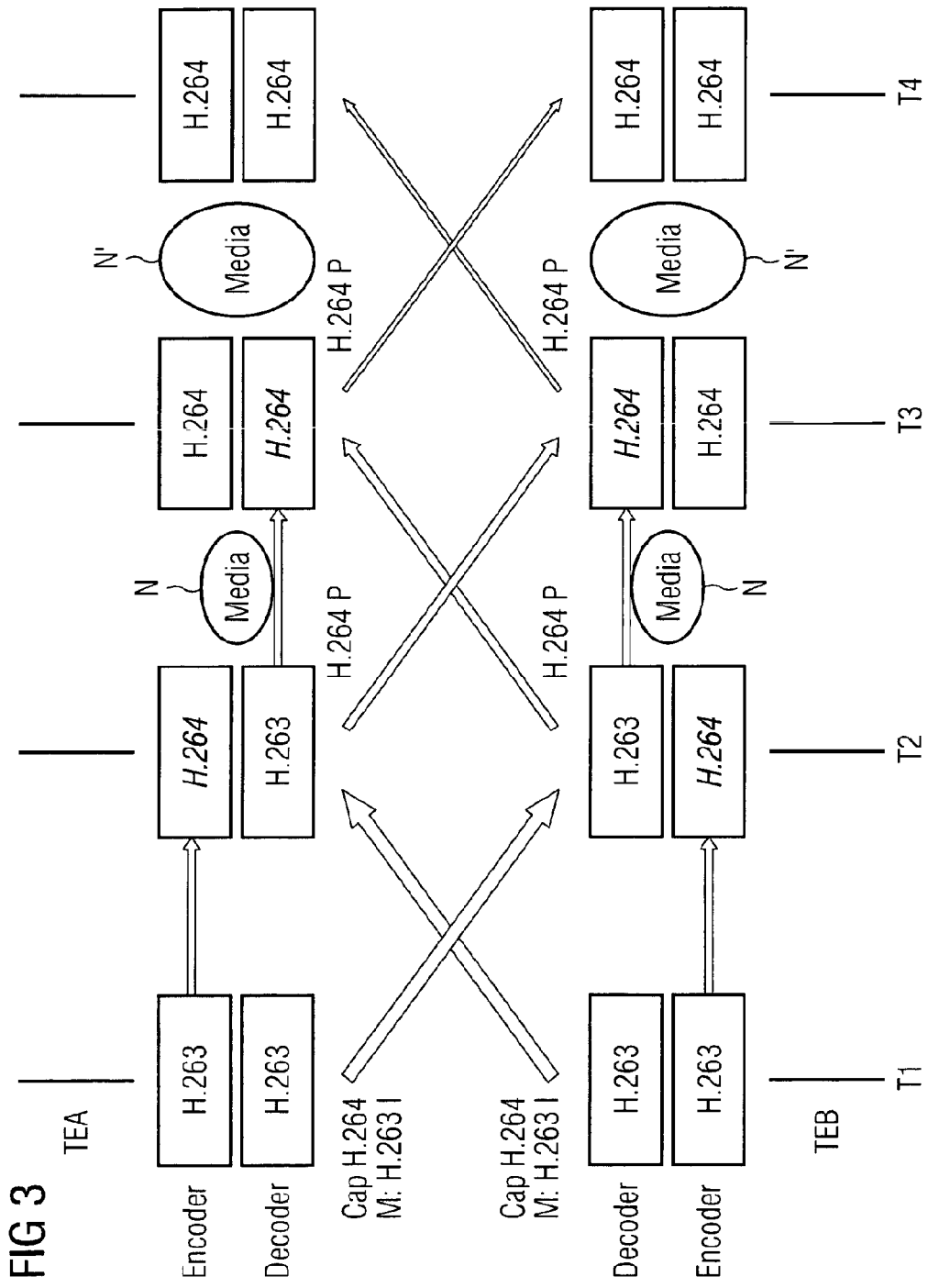
Figure 4:
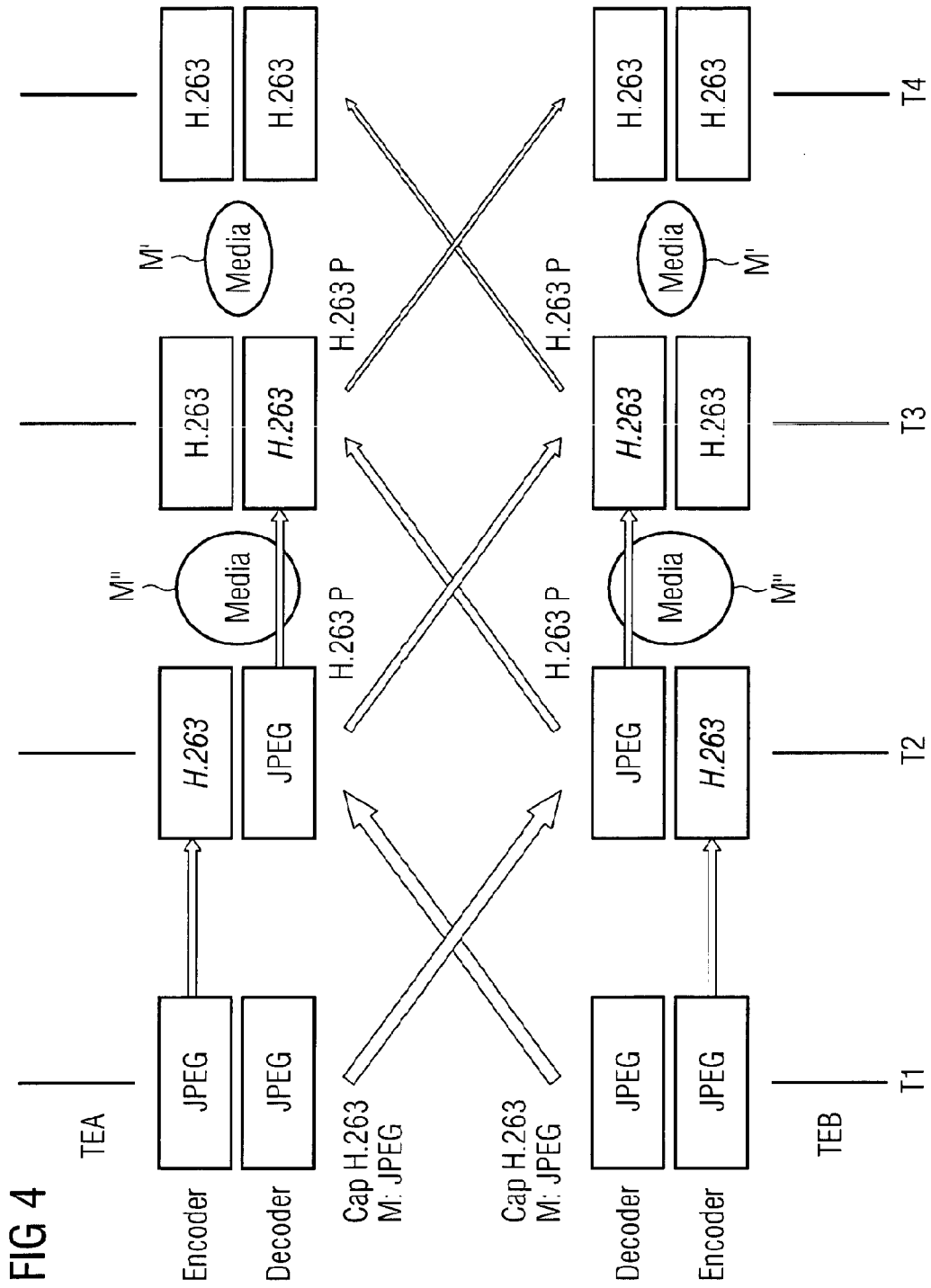
Figure 5:
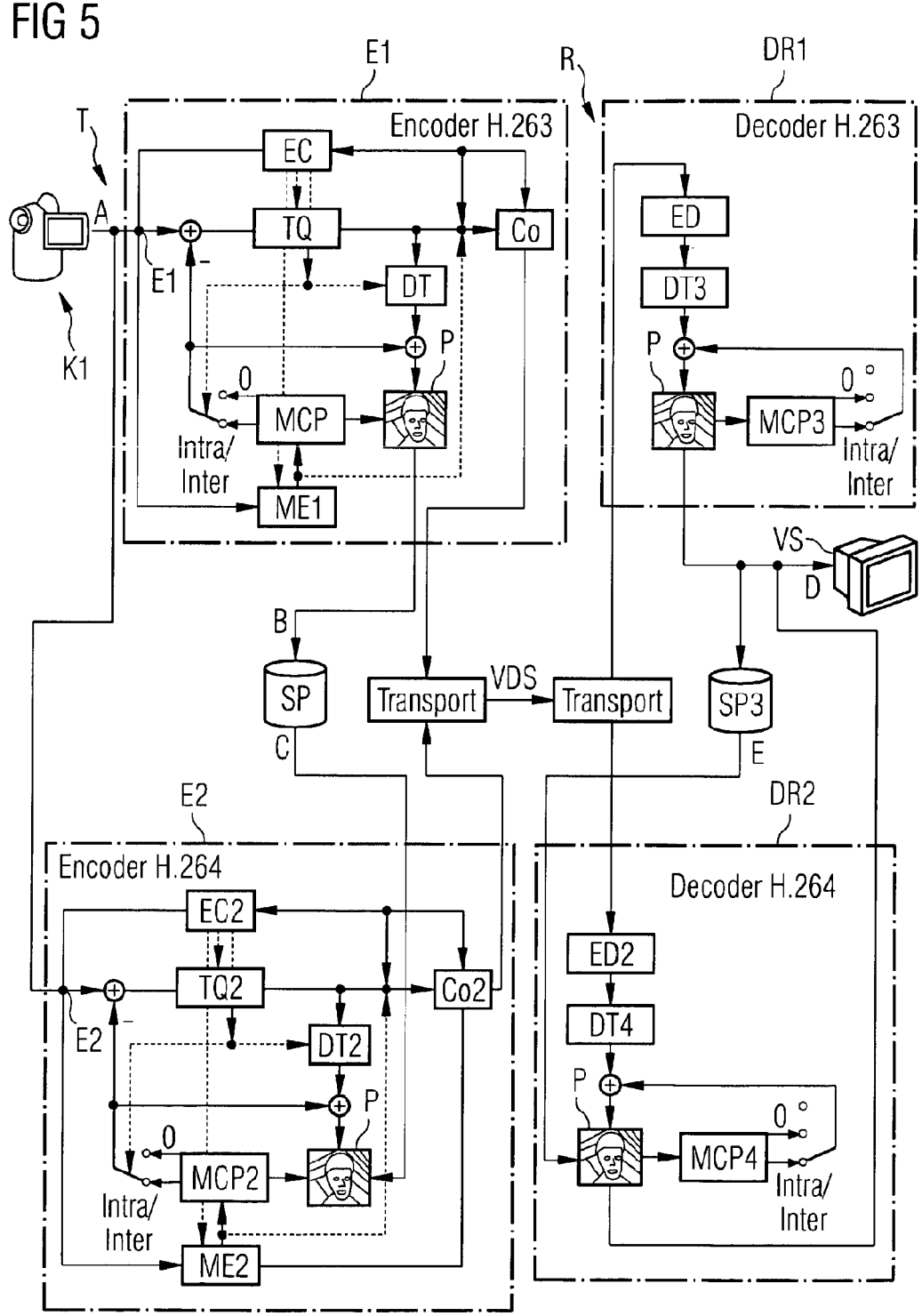
Figure 6:
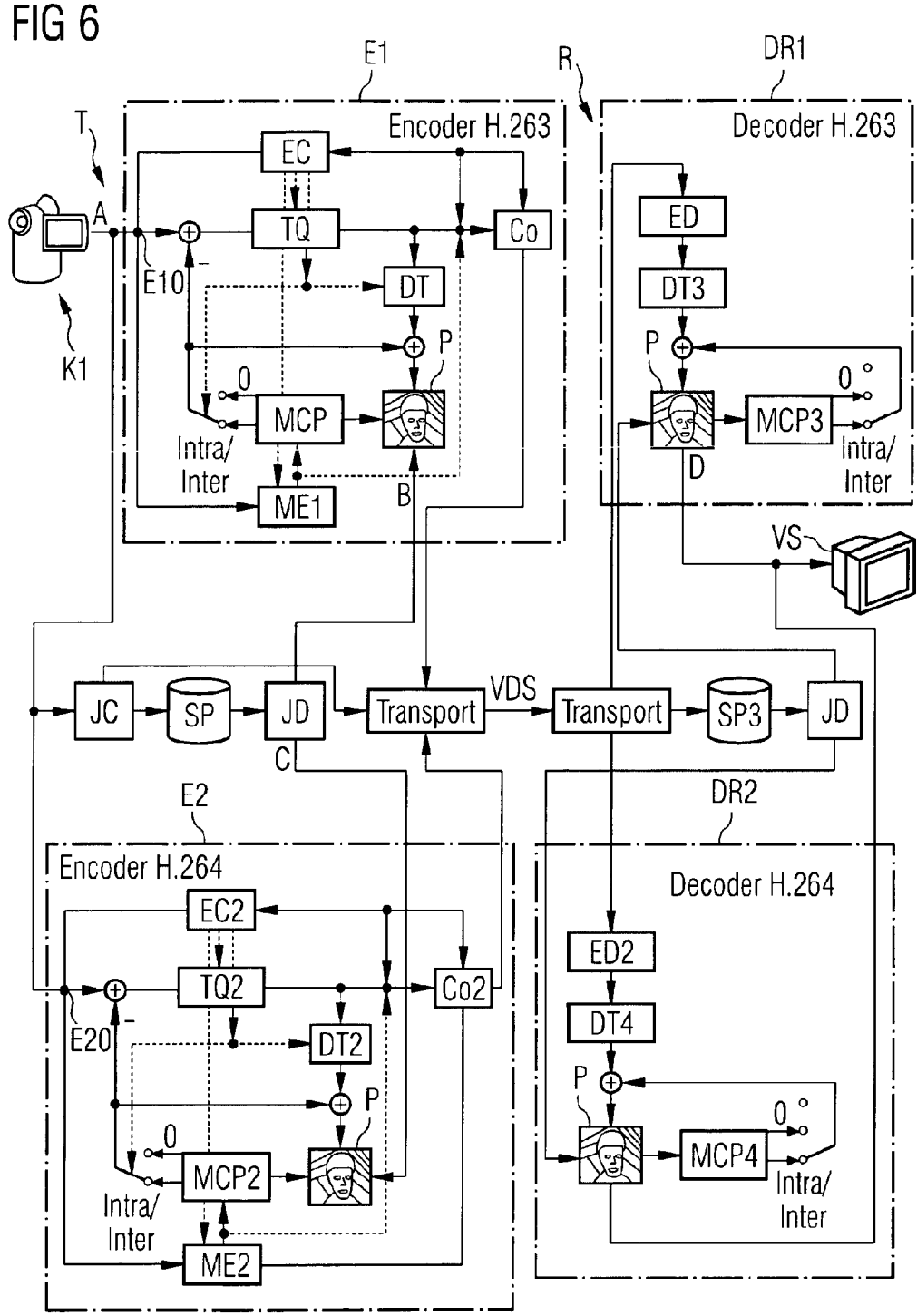

The invention is explained in detail hereinunder with reference to exemplified embodiments with reference to the drawings, in which:

FIG. 1 shows a first example of a time sequence of a communication between two mobile radio units according to a known method, FIG. 2 shows a second example of a time sequence of a communication between two mobile radio units according to a further known method, FIG. 3 shows a first example of a time sequence of a communication between two mobile radio units according to a first embodiment of the method according to the invention, FIG. 4 shows a second example of a time sequence of a communication between two mobile radio units according to a second embodiment of a method in accordance with the invention, FIG. 5 shows a first exemplified embodiment of a transmitter and receiver, which contain encoders and decoders which function according to the method in accordance with the invention, FIG. 6 shows a further exemplified embodiment of the invention.

FIG. 1 shows a known method for creating a communication for a video transmission between two mobile communication units which are described as TEA and TEB. The two communication units have already connected to each other earlier and exchanged data. To create such a connection, it is necessary, for example, for the two units to identify themselves and to signal that they are both suitable for transmitting video images without them having to agree in more detail about the video transmission standard to be used. The two mobile communication units TEA and TEB in this exemplified embodiment each have an encoder and a decoder which are configured for encoding or decoding video data. It is naturally likewise possible to make a unidirectional connection, i.e. a connection in only one direction.

Furthermore, the two mobile communication units have agreed earlier to perform a video transmission. For this purpose they each have an encoder and a decoder ready and started. The decoder is able to decode a data stream received according to the video standard H.263. Accordingly, image data and video signals can be converted in each mobile communication unit A and B into a data stream according to the H.263 standard and transmitted to the respective other mobile communication unit.

In order to ensure that the user can commence as quickly as possible to transmit video data, a special method is provided, for example, for the communication standard WCDMA/ UMTS, which is described as "Fast Media" (FM). In the case of this method, the two mobile communication units A, B start to transmit the relevant video information once they have agreed on a common video data transmission. This is described in FIG. 1 as the medium M. The mobile communication unit A transmits at the point in time T1 video data M in a specific data stream format according to the video transmission standard H.263 to the mobile communication unit B. Accordingly, the mobile communication unit B transmits a data stream with video data in the same format, i.e. according to the standard H.263, to the mobile communication unit A.

The two mobile communication units A and B are furthermore able to use the video transmission standard H.264. This differs in respect to the video transmission standard H.263 in that it is possible with the same image quality to compress data in a considerably more efficient manner. Conversely, this means that with the constant transmission rate through the video standard H.264 it is possible to achieve a considerably superior image quality than with the hitherto video standard H.263 used by the two terminals.

In parallel to the actual data streams which contain video information in accordance with the H.263 standard, the mobile communication unit A also transmits the video transmission standards for which it is likewise also suitable. This procedure is called Cap from the English term "Capabilities". This is here the standard H.264. The mobile communication unit B functions in the same manner.

At the subsequent points in time T2 and T3 the corresponding transmitted data streams are received, the information contained therein is decoded as video data decoded and output to the respective user on a screen [sic]. However, there is no switch-over here to the new, superior video transmission standard H.264 because in so doing the transmitted video data stream would have to be interrupted and this is precisely what the user does not want. Consequently, the communication is now continued with the poorer video transmission standard H.263.

FIG. 2 shows a similar example, where two mobile communication units are also able to encode or decode video signals in accordance with the video transmission standards H.263 and H.264. A data transmission of image information likewise commences in accordance with the video transmission standard H.263 (indicated by M: H.2631). Simultaneously, the two mobile communication units A, B transmit their respective video transmission standards, in which they are also proficient. This is again here the improved video transmission standard, H.264.

However, instead of now out-putting the video information in accordance with the video transmission standard H.263, the video information which has already been transmitted is discarded and at the subsequent points in time T2 and T3 the encoders or the decoders are started and prepared for the standard H.264. The output of the video information is therefore not commenced until after the point in time T3.

In the case of the known method it is therefore necessary in order to switch-over the encoding or decoding of the image information either to deactivate the hitherto used decoders and start afresh the new decoders or the video transmission continues further with the hitherto used encoder or decoder. If therefore in a mobile radio unit, for example, an encoder for a video transmission standard is enabled and used and the other mobile radio unit does not have a suitable decoder for this standard, then the video transmission fails. For this reason, it is necessary for the encoder and decoder for the respective identical video transmission standard to be available.

FIG. 5 shows a schematic illustration of a transmitter T and a receiver R, in which the above illustrated problems can be avoided. The transmitter T is configured to convert a video signal A from a camera K1 with the aid of a first encoder E1 or a second encoder E2 into a video data stream coded according to a video transmission standard. In detail, the first encoder E1 is configured to generate a data stream from the video signal A according to the video transmission standard H.263. The encoder E2 is able to convert the video information A into a video data stream according to the video transmission standard H.264.

Here the term 'convert into a video data stream according to a video transmitting standard' means that the generated data stream contains the information of the video signal A and is present in a data format which is described in the respective video transmission standard. Naturally, the standard can also contain details regarding the encoding of the video signal or the decoding of the data stream in user data.

The two encoders E1 and E2 are illustrated schematically with their essential functional elements. The individual elements can for example be implemented using various software functions. Thus, for example, a microprocessor is provided in the transmission direction T which performs the corresponding functions for the encoder E1 or for the encoder E2. This is particularly flexible because such dynamic new video transmission standards can be implemented in the transmitter T with the aid of a simple software update. It is also possible in this way to switch easily between different standards and applications. However, it is likewise feasible to provide special application-specific switchings which convert the respective video signals A into a video data stream in a data stream format according to a video transmission standard.

In a corresponding manner, the receiver R comprises a first decoder DR1 and a second decoder DR2. The first decoder DR1 is configured to decode a video data stream, which contains image information in a data stream format according to the video transmission standard H.263 into a video output signal B. In a similar manner, the decoder DR2 is configured to convert the video data stream into image information. As in the case of the transmitter T, it is also possible in the case of the receiver R for the two decoders DR1 and DR2 to be implemented using software functions.

The two encoders E1, E2 use a so-called "predictive coding". For this purpose they make use of the characteristic that two sequential video images often have only slight differences. Thus, it is possible to save only the changes with respect to the preceding video image, rather than it be necessary to detect fully each individual video image, the so-called frame.

For this purpose the two encoders E1 and E2 comprise a so-called "Reference Frame Buffer" P. An image or several images or also a partial image of the video signal are stored in the buffer P. The video signal A, which is supplied, for example, to the input E10 of the first encoder E1 is quantized in the device TQ and subsequently further processed in the device DT. The quantizer generates a smoothed version of the image which can then be coded efficiently. A corresponding dequantizer in the decoder then reverses this process. Transformation and inverse transformation in the decoder describe a discrete Fourier transformation or other transformations which is applied to the images or partial images in order to be able to perform the coding process in a more efficient manner. Further processing is performed in dependence upon control signals of an encoding control unit EC which controls both the quantization in the device TQ and also the further processing performed in the device DT. The image processed in the device DT is stored as reference data in the "Reference Frame Buffer" P.

A device MCP, the "Motion Compensated Predictor" has access to the buffer P and said device compares the motion of the images stored in the reference buffer P with the preceding images and generates relevant information therefrom. The buffer is used to decide whether for the coding it is necessary to code a full or rather partial image or whether it is merely sufficient to code the changes with respect to the preceding image. The device MCP is controlled by a "Motion estimator" (MEI) which examines the video signal A for movements. The output information of the "Motion Compensated Predictor" MCP, or, for example, motion vectors are supplied to the video signal information A.

The subsequently changed signal is likewise quantized in the device TQ and subsequently coded using a coding method, generally an entropy coding method, for example, a Huffman code. The coded video data stream is thus in a data stream format which is specified according to the video transmission standard H.263. The data stream is then encapsulated in a transport stream VDS with which a transmission to the receiver R is possible. The "Real Time protocol" (RTP) or also the protocols and recommendations of the ITU-T, the H.223, H.225, H.323, H.324 or H.320 are suitable for this purpose.

It is possible in the manner illustrated for the encoder E1 to code only the information which characterizes the differences between two sequential video images. In addition, individual images are generated and coded at more or less regular intervals. This is then performed, for example, if the motion is too great or a full image change occurs, so that storing only the changes does not represent any saving.

The transport stream VDS is subsequently transmitted via an air interface or a wire-supported line to the receiver R, where the video data stream is extracted from the transport stream and then supplied to the decoder DR1. The decoder DR1 decodes the data stream in the device ED with the aid of entropy coding and further processes the decoded data subsequently in the device DT3. The image contained in the decoded data is stored in a buffer device P. A device MCP2 in the form [of] a "Motion Compensated Predictor" recognizes whether the stored information is a full video image or merely changes with respect to a preceding image. In this manner, information which relates only to changes with respect to a preceding image can be stored in the "Reference Frame Buffer" P, where the memory contents of the buffer P are partially overwritten. The stored image is generally output simultaneously or with a slight time-delay as video information D to a screen VS.

A process of switching from a decoder DR1 to a second decoder DR2 for decoding from a video data stream with a different video transmission standard is in the case of known methods the hitherto used decoder DR1 completely switched off [sic]. In particular, the "Reference Frame Buffer" P which contains the hitherto transmitted video information and in particular the latest transmitted video information is terminated and its memory enabled. Simultaneously, the new decoder DR2 is initialized. In a corresponding manner, a similar switching process is also performed on the transmitter side. Immediately following a switching process the new encoder E2 and also the new decoder D2 contains a substantially empty buffer P. This is only filled with relevant information after the video signal has been processed. However, this also means that the newly enabled encoder must completely code a new image and not merely the changes with respect to the preceding image.

Therefore, additional time is required to completely switch off the hitherto used encoder or decoder and to initialize the new encoder or decoder and in the case of such a switching process this can cause the video data stream to be interrupted. This will be apparent to the user, who will find it disturbing. For this reason, it is provided in the invention that the new decoder DR2 in the case of such a switching process is not enabled with an "empty" buffer P.

On the contrary, a reference image or reference information which is contained for example in buffer P of the first decoder DR1 is saved temporarily in a memory device SP3 and supplied as reference data E to the "Reference Frame Buffer" P of the second decoder DR2. Thus, when initializing the second decoder DR2, it receives a start value, for example a "Reference Frame". It should be noted here that the format of this "Reference Frame", i.e. the data which is taken from the buffer P of the first decoder DR1 and in the buffer of the new decoder DR2 is compatible for both decoders. In other words, this means that, whereas the video data stream extracted from the transport stream VDS can be processed by only one of the two decoders, the data from the buffers P can be processed by both decoders.

In the same manner, in this example also in the transmitter T the encoder E2 which is to be re-enabled is initialized with reference data C from an intermediate memory SP in a frame buffer P. The reference data are obtained from the reference buffer P in the encoder E1. The data in the buffer P of one of the two encoders can also be read here by the respective other decoder.

By initializing both the new decoder DR2 and also the new encoder E2 it is possible to perform an encoding and decoding process without interruption. Furthermore, in particular, as a consequence only the changes with respect to the preceding image can be encoded or decoded without interruption, since the encoder on the transmitter side and also the decoder on the receiver side is not "empty", but rather is enabled with a start value, namely the content of the buffer of the old encoder or decoder.

The central idea of the invention is therefore in the case of a switching process or applying anew a video transmission for the decoder or encoder not to be empty when being initializing but rather for them to be initialized with a start value. It is precisely this start value which contains information relating to a reference image, which has been encoded or decoded earlier. As a consequence, the coding efficiency in the case of a switching process can be significantly increased since an already existing reference image in the hitherto used encoder or decoder can be reused.

FIG. 3 shows such a method operation and the gain in time when transmitting video data. At the point in time T1 the two mobile radio units TEA and TEV each transmit video information M:H.263I in the data format of the video transmission standard H.263. They transmit here a full image to the respective other mobile radio unit. Simultaneously, they likewise transmit the video transmission standards which they both can read. In this case, this would be the video transmission standard H.264.

Since the video transmission standard H.264 has a considerably greater band width efficiency than the video transmission standard H.263, it is expedient for the encoding and decoding process to use the new superior video transmission standard H.264. This means that the encoder of the mobile radio unit A is changed at the point in time T2 once the communication unit TEB has informed the other communication unit TEA that it can also decode a video data stream in the format of the standard H.264. For this purpose, the reference image contained in the reference frame buffer P is written to an intermediate memory, the encoder for the standard H.263 is deactivated and the encoder H.264 is enabled. This is initialized with the reference image which is located in the intermediate memory and which also corresponds substantially to the latest image in the transmitted data stream M:H.263I. In the same manner, a switch-over occurs for the encoder in the mobile communication unit TEB.

Meanwhile, the transmitted video data stream M:H.263I of the unit TEB is supplied in the communication unit TEA to the decoder for the video transmission standard H.263 and the user data located therein extracted in the form of a video image N. This is displayed to the user on a screen. This process is also performed in the second mobile communication unit TEB.

In parallel to the decoding process, a new video signal is coded and transmitted in both mobile communication units A and B with the aid of the newly initialized encoder for the video transmission standard H.264. Since the encoder in the unit TEA has been initialized as also the encoder in the unit TEB with a reference image, the new video signal need no longer be completely coded as an image. On the contrary, it is sufficient with the aid of the reference image stored in the buffer to determine the changes, to code these in the format of the H.264 standard and to transmit them. In FIG. 3, this is described by H.264P, wherein "P" clearly indicates that only the changes are involved.

During the time period T3, a reference image is now temporarily stored in the hitherto used decoders for the standard H.263. Subsequently, the two decoders are deactivated for the standard H.263 in the mobile radio units A and B and the new decoders for the transmission standard H.264 activated and initialized with the reference images which have been stored temporarily. This also occurs, in that the information saved as reference data in the buffers P of the decoders for the standard H.263 is stored as reference data in the buffers of the decoders for the standard H.264.

As a consequence, the newly enabled decoders are able to decode directly the transmitted video data H.264P and to process the changes contained therein. The video images N' obtained this way are then displayed to the user. In the periods of time now following, the encoders or decoders are active in the two mobile radio units for the video transmission standard H.264.

By dynamically switching in this way and initializing the respective newly activated decoder using a reference image from the hitherto used decoder it is possible on the one hand to create a video transmission extremely quickly and to switch over without interruption between the different video transmission standards.

FIG. 6 shows a further embodiment of the invention. In this case an image decoder JD is provided in the receiver adjacent to the two decoders DR1 and DR2. This image decoder is connected to the intermediate memory SP3 in the receiver R which for its part is coupled to the input of the receiver. Compressed reference data can be stored in the intermediate memory SP3 and are transmitted from the transmitter T with the transport data stream. The data are converted by the decoding unit JD into a corresponding reference image and depending upon the selected decoder DR1 or DR2 are loaded during an initialization process into the corresponding "Reference Frame Buffer" P. The reference image can be in a specific format, for example JPEG, PNG or a different format. This can also be a loss-free format. By transmitting an individual image it is possible right at the beginning of a video transmission to achieve a high degree of flexibility with respect to the video transmission standard to be selected and thus with respect to the decoder to be used.

On the transmitter side, a first image of a video signal A is stored by a coding device JC in an intermediate memory SP and simultaneously transmitted to the receiver R. Thus, this embodiment is suitable particularly if a common video transmission standard between the transmitter T and the receiver R is not yet known or if additional time is required to initialize the relevant decoder. The transmitter T furthermore comprises a decoding device JD which is coupled to the memory device SP. This generates reference data from the coded image information of the video signal A in the memory device SP. When selecting one of the two encoders E1 or E2 the reference data generated in this manner are used to initialize the relevant frame buffer P of the respective selected encoder E1 or E2. It is thereby possible to continue with the aid of the coded reference image stored in the memory device SP, immediately following an initialization of a coding of the video signals.

In addition, when transmitting the reference image in the transport stream it is also simultaneously signaled in which video transmission standard the following information is coded. By virtue of this signal, it is guaranteed that both on the transmitter side and also on the receiver side the encoder or decoder are selected or changed at a coordinated moment in time.

FIG. 4 shows the corresponding time sequence for this method. At the start time T1 in both mobile communication units TEA, TEB an encoder or a decoder is active which is configured to encode or decode images in JPG format. Accordingly, the mobile communication unit A transmits an individual image M:JPEG to the communication unit B and conversely. Furthermore, also here the possible video transmission standards are transmitted again Cap H.263. At the point in time T2, the corresponding encoder for the video transmission standard H.263 is enabled in the two mobile communication units TEA and TEB and initialized as a reference with the image transmitted and stored in an intermediate memory. Whereas the transmitted image is output from the respective decoders to the users on the screen as image M", further video signals are coded by the encoders in accordance with the video transmission standard H.263 using the reference image stored in their reference frame buffers and transmitted as data stream H.263P.

At the point in time T3, the decoder in the respective mobile communication units is now enabled for the video transmission standard H.263 and initialized as a reference image with the JPG image decoded during the preceding time period T2. The video transmission data H.263P received at the point in time T3 are now decoded using the reference image in the corresponding decoders and output as images M'.

It is essential in the case of the invention that both on the transmitter side and also on the receiver side during a switching process always the respective encoder or decoder is initialized with the same reference image. This can be, for example, the respective latest reference image located in the preceding decoder. Likewise, it is expedient during the switching process to transmit a corresponding control signal to the receiver, in which the information required for initializing the new decoder is referenced. For example, it is possible on the transmitter side to transmit that the hitherto used decoder is now to write its reference frame buffers to an intermediate memory. The decoder which is to be started afresh is then to be initialized using this information from the intermediate memory. By virtue of these additional control signals to be transmitted it is guaranteed that the new decoder used on the receiver side is initialized using the same information with which the new encoder on the transmitter side is also initialized. As a consequence, an uninterrupted and constant transmission quality is guaranteed during the switching process.

By using format-independent reference data it is guaranteed that also a decoder can be initialized which is incompatible to the format of the data stream from which the reference data are obtained. Furthermore, the reference data, in particular in the form of a reference image are suitable to be scaled accordingly for this purpose. For example, a reference image with the dimensions 176×144 pixels which was taken from a decoder for a first data stream format can be interpolated on a new image with the dimensions 320×240. This is possible, for example, using a suitable intermediate memory. After scaling, the new image is used as a reference for initializing the newly enabled decoder.

In addition to the examples implemented here for the video transmission standards H.263 and H.264 it is naturally also possible to use other video transmission standards, for example an MPEG-2, MPEG-4, DivX, VC1 or other encoding or decoding methods. Different protocols are likewise possible for the signaling process, i.e. the control which governs the switch-over between the decoders or the activation of a specific decoder. For example, it is possible to accommodate in the video transmission standard H.264 additional information in the form of SEI ("Supplemental Enhancement Information") messages, in which the signalizing process can be displayed. It is likewise possible to transmit further information in addition to the actual video data stream. Different protocols are available for this purpose, e.g. the "Session Description Protocol", the "Session Initiation Protocol" or the H.245 specification.

Also, the invention is not limited to wireless communication. Thus, irrespective of the information to be transmitted, the invention allows a switch-over between different encoding or decoding methods, as long as in the case of an initialization process of a new encoder or decoder reference information is additionally saved from the hitherto used encoder or decoder into the newly enabled one.

List of Designations
T: Transmitter
R: Receiver
A: Video signal
E1, E2 Encoder
DR1, DR2: Decoder
E10, E20: Inputs
ME1, ME2: Motion Estimator
TQ1, TQ2: Transformer, Quantizer
MCP, MCP2: Motion Compensated Predictor
EC, EC2: Encoding control unit
DT, DT2: Deq./Inv. Transform
Co, Co2: Entropy-Encoder
ED, ED2: Entropy-Decoder
DT3, DT4: Deq./Inv. Transform
MCP3, MCP4: Motion Compensated Predictor
SP, SP3,: Intermediate memory
JC: Image encoder
JD: Image decoder
P: Buffer, Frame buffer
D: Video image, user data
VDS: Transport stream

The invention claimed is:
1. A method for decoding data streams comprising:
receiving, at a receiver, a data stream in a first format from a transmitting device;
decoding, using a first decoder of the receiver, a first block of data and a second block of data of the data stream using the first format, wherein the second block of data is predictively decoded using reference data generated using the first block of data, wherein the reference data is stored at a buffer of the first decoder;

updating the reference data stored at the buffer of the first decoder based on the second block of data to generate updated reference data;

receiving a control signal from the transmitting device indicating that the data stream is to be subsequently transmitted in a second format;

in response to receiving the control signal, initializing a second decoder of the receiver using the updated reference data stored at the buffer of the first decoder, wherein the second decoder is configured to decode data streams using the second format, and wherein initializing the second decoder includes storing the updated reference data at a buffer of the second decoder; and subsequent to receiving the control signal, decoding a third block of the data stream using the second decoder, wherein the third block is predictively decoded using the updated reference data stored at the buffer of the second decoder, and wherein the second decoder decodes the third block of the data stream using the second format.

2. The method of claim 1, further comprising:
temporarily storing the updated reference data in an intermediate buffer of the receiver.

3. The method of claim 2, further comprising:
subsequent to decoding the first data block of the data stream and the second data block of the data stream using the first format, providing the decoded first data block and the decoded second data block to a display coupled to the receiver; and subsequent to decoding the third data block of data stream using the second format, transmitting the decoded third data block to the display, wherein a transition presenting the decoded second data block to the decoded third data block occurs without interruption.

4. The method of claim 2, further comprising updating the updated reference data stored at the buffer of the second decoder using the third data block to generate additional updated reference data, wherein a subsequently received data block is predictively decoded using the additional updated reference data.

5. The method of claim 2, wherein the updated reference data includes a first reference image, wherein the transmitting device initializes a second encoder using a second reference image concurrently with transmission of the control signal, and wherein the first reference image and the second reference image are a same reference image.

6. The method of claim 5, wherein the transmitting device transmits the control signal in response to receiving information indicating that the receiver is configured to decode data streams using the first format and the second format.

7. The method of claim 6, further comprising:
prior to receiving the first data block of the data stream, receiving an initial data block of the data stream from the transmitting device; and initializing the first decoder based on the initial data block of the data stream, wherein the initial data block includes initial reference data, and wherein initializing the first decoder includes storing the initial reference data at the buffer of the first decoder.

8. The method of claim 5, wherein a format of the first reference image is one of a JPEG format or a PNG format.

9. The method of claim 1, wherein the first format corresponds to a video transmission standard selected from a group consisting of a H.263 format, a H.264 format, a MPEG-2 format, a MPEG-4 format, a DivX format, or a VCI format, and wherein the second format corresponds to a different video transmission standard selected from the group consisting of the H.263 format, the H.264 format, the MPEG-2 format, the MPEG-4 format, the DivX format, or the VCI format.

10. The method of claim 1, wherein the data stream is received in at least one of an IETF Real Time Protocol format, an ITU-T Recommendation H.324 format, an ITU-T Recommendation H.323 format, an ITU-T Recommendation H.320 format, an ITU-T Recommendation H.223 format, or an ITU-T Recommendation H.225 format.

11. The method of claim 1, wherein the control signal is transmitted in at least one of an ITU-T Recommendation H.264 format, a Supplemental Enhancement Information format, an ITU-T Recommendation H.245 format, a Session Description Protocol format, or a Session Initiation Protocol format.

12. The method of claim 1, wherein a format of updated reference data corresponds to a JPEG format, a PNG format, or a GIF image format.

13. A mobile communication unit, comprising:
a receiver to receive a data stream in a first format from a transmitting device, the receiver comprising:
a first decoder, wherein the first decoder includes a first buffer; and
a second decoder, wherein the second decoder includes a second buffer,
wherein the first decoder is configured to:
decode a first block of data and a second block of data of the data stream using the first format, wherein the second block of data is predictively decoded using reference data generated using the first block of data, and wherein the reference data is stored at the first buffer of the first decoder; and
update the reference data stored at the first buffer based on the second block of data to generate updated reference data,
wherein, in response to receiving a control signal, at the receiver from the transmitting device, the second decoder is configured to:
initialize a second decoder using the updated reference data stored at the first buffer, wherein the control signal indicates that the data stream is to be subsequently transmitted in a second format, wherein the second decoder is configured to decode data streams using the second format, and wherein initializing the second decoder includes storing the updated reference data at the second buffer; and
subsequent to receiving the control signal, decode a third block of the data stream using the second decoder, wherein the third block is predictively decoded using the updated reference data stored at the second buffer, and wherein the second decoder decodes the third block of the data stream using the second format.

14. The mobile communication unit of claim 13, wherein the receiver includes an intermediate memory, wherein, in response to generating the updated reference data, the updated reference data is stored in the intermediate memory in addition to storing the updated reference data in the first buffer.

15. The mobile communication unit of claim 13, wherein the second decoder predictively decodes successive data blocks of the data stream received in the second format using reference data stored at the second buffer.

16. The mobile communication unit of claim 13, wherein the updated reference data comprises an image, and wherein the transmitter device concurrently initializes the second encoder using the same reference image.

17. The mobile communication unit of claim 16, wherein the updated reference data includes a first reference image, wherein the transmitting device initializes a second encoder using a second reference image concurrently with transmission of the control signal, and wherein the first reference image and the second reference image are a same reference image.

18. A non-transitory computer-readable medium containing instructions that, when executed by a receiver having a first decoder and a second decoder, cause the receiver to:
   receive a data stream from a transmitting device, wherein the data stream is encoded using a first format;
   decode, using the first decoder, a first block of data and a second block of data of the data stream using the first format, wherein the second block of data is predictively decoded using reference data generated using the first block of data, wherein the reference data is stored at a buffer of the first decoder;
   update the reference data stored at the buffer of the first decoder based on the second block of data to generate updated reference data;
   receive a control signal from the transmitting device indicating that the data stream is to be subsequently transmitted in a second format;
   in response to receiving the control signal, initialize the second decoder using the updated reference data stored at the buffer of the first decoder, wherein the second decoder is configured to decode data streams using the second format, and wherein initializing the second decoder includes storing the updated reference data at a buffer of the second decoder; and
   subsequent to receiving the control signal, decode a third block of the data stream using the second decoder, wherein the third block is predictively decoded using the updated reference data stored at the buffer of the second decoder, and wherein the second decoder decodes the third block of the data stream using the second format.

19. The non-transitory computer-readable medium of claim 18, wherein the updated reference data includes a first reference image, wherein the transmitting device initializes a second encoder using a second reference image concurrently with transmission of the control signal, and wherein the first reference image and the second reference image are a same reference image.

20. The method of claim 1, further comprising transmitting, to the transmitting device, information indicating that the receiver is configured to decode data streams using the first format and the second format, wherein the transmitting device transmits the control signal in response to receiving the information indicating that the receiver is configured to decode data streams using the first format and the second format.

* * * * *